(12) United States Patent
Todaka (10) Patent No.: US 8,326,090 B2
(45) Date of Patent: Dec. 4, 2012

(54) SEARCH APPARATUS AND SEARCH METHOD

(75) Inventor: Shinji Todaka, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 910 days.

(21) Appl. No.: 11/551,904

(22) Filed: Oct. 23, 2006

(65) Prior Publication Data

US 2007/0041668 A1 Feb. 22, 2007

Related U.S. Application Data

(63) Continuation of application No. PCT/JP2006/314572, filed on Jul. 24, 2006.

(30) Foreign Application Priority Data

Jul. 28, 2005 (JP) .................................. 2005-219441

(51) Int. Cl.
*G06K 9/03* (2006.01)
*G06K 9/34* (2006.01)
*G06K 9/00* (2006.01)
*G06K 9/72* (2006.01)
*G06F 7/00* (2006.01)

(52) U.S. Cl. ........ 382/305; 382/176; 382/180; 382/181; 382/229; 707/708; 707/718; 707/736

(58) Field of Classification Search .................. 382/170, 382/171, 176, 180, 229, 305; 707/708, 718, 707/736, 737; 715/210
See application file for complete search history.

(56) References Cited

U.S. PATENT DOCUMENTS

| | | | | | |
|---|---|---|---|---|---|
| 5,459,579 | A | * | 10/1995 | Hu et al. | 358/296 |
| 5,913,215 | A | * | 6/1999 | Rubinstein et al. | 707/708 |
| 6,397,213 | B1 | * | 5/2002 | Cullen et al. | 1/1 |
| 6,910,184 | B1 | * | 6/2005 | Yano et al. | 715/201 |
| 7,548,916 | B2 | | 6/2009 | Kaneda | |
| 2002/0136468 | A1 | * | 9/2002 | Sun | 382/305 |
| 2002/0174101 | A1 | * | 11/2002 | Fernley et al. | 707/1 |
| 2002/0194166 | A1 | * | 12/2002 | Fowler | 707/3 |
| 2003/0016875 | A1 | * | 1/2003 | Kobayashi et al. | 382/239 |
| 2004/0220962 | A1 | | 11/2004 | Kaneda | |

(Continued)

FOREIGN PATENT DOCUMENTS

JP 3-14184 A 1/1991

(Continued)

OTHER PUBLICATIONS

International Search Report mailed Aug. 22, 2006 for corresponding PCT/JP2006/314572.

(Continued)

*Primary Examiner* — Anand Bhatnagar
*Assistant Examiner* — Soo Park
(74) *Attorney, Agent, or Firm* — Fitzpatrick, Cella, Harper & Scinto (57) ABSTRACT

An object of this invention is to allow a user to easily and simply designate or input an image serving as a document search key. That is, a search apparatus reads a document image (S7001) to obtain image data, extracts an image region in the image data (S7004), and displays, on display means, a list of images corresponding to the extracted image regions (S7008). When a user selects at least one of the images displayed in the list via an input means (S7009), the search is executed by using the selected image as a search key (S7010).

9 Claims, 8 Drawing Sheets

U.S. PATENT DOCUMENTS

2004/0243602 A1* 12/2004 Shiiyama ............... 707/100
2005/0086205 A1* 4/2005 Franciosa et al. ......... 707/3
2006/0004728 A1* 1/2006 Gotoh .................... 707/3

FOREIGN PATENT DOCUMENTS

| JP | 05-274367 | | 10/1993 |
|----|-----------|---|---------|
| JP | 05-274368 | | 10/1993 |
| JP | 10-3483 A | | 1/1998 |
| JP | 10-340272 | | 12/1998 |
| JP | 10340272 A | * | 12/1998 |
| JP | 2890482 B2 | | 5/1999 |
| JP | 2004334339 A | | 11/2004 |

OTHER PUBLICATIONS

Chinese Office Action issued on Oct. 21, 2011, in counterpart Chinese Patent Application No. 200680027651.3.

* cited by examiner

SEARCH APPARATUS AND SEARCH METHOD

CROSS REFERENCE TO RELATED APPLICATIONS

This application is a continuation of International Application No. PCT/JP2006/314572, filed Jul. 24, 2006. The entire disclosure of this prior application is incorporated by reference herein.

TECHNICAL FIELD

The present invention relates to a search apparatus and a search method. More specifically, the present invention relates to a technology for searching target document data by using image data contained in the document data as a search key, in case of searching the target document data out of stored document data using a search apparatus having a function of storing information of document data read by, e.g., a scanner.

BACKGROUND ART

In the recent office environments, the quantity of document data to be managed increases greatly as the work becomes complex and the amount of information increases. For this reason, the need for searching a target document from a huge number of documents is even more increasing. By converting pieces of document information into electronic data and storing as document data, a document search apparatus or document search system is able to use this converted information upon searching a target document.

Various document search methods have been proposed including document attribute search which searches information (namely, attribute data) associated with document data, full text search which searches a character string contained in document data, and image data search which searches image data contained in the document data.

To execute these search methods, it is necessary to input a search key to a search apparatus (search engine). Unlike a search method such as attribute search or full text search that uses a character string as a key, the problem of image searching using image data as a key is how to allow a user to easily and simply designate or input such image search key.

For example, an image storage apparatus described in patent reference 1 obtains a search key by scanning with a scanner a document with an area designated in advance. Further, an image storage apparatus described in patent reference 2 extracts a search key by displaying, on a window, document data obtained by scanning with a scanner and designating an area to be used as a search key by using, e.g., a mouse. Still further, a similar image search apparatus described in patent reference 3 registers image data to be used as a search key in advance, and designates a search key among the registered image data.

Patent reference 1: Japanese Patent Laid-Open No. 5-274367
Patent reference 2: Japanese Patent Laid-Open No. 5-274368
Patent reference 3: Japanese Patent Laid-Open No. 10-340272

DISCLOSURE OF INVENTION

Problems to be Solved by the Invention

However, in order to designate the area to be registered as a search key in the image storage apparatus described in patent reference 1, it is necessary to write area information in the original document. This operation is cumbersome for the user. Additionally, to keep the original document clean, the document must be copied.

To allow the user to designate the area serving as a key in the image storage apparatus described in patent reference 2, operation means such as a pen device or mouse is necessary to designate the area. An OA device such as a multifunctional peripheral having a scanner function, copy function, and print function normally has no such operation means. Hence, operation means not used except image searching must be newly added, and the attachment position or accommodation method for the operation means raises a new problem. Further, in order to extract a plurality of search keys from a sufficiently large display region, the user must do the cumbersome area designation a plurality of times.

In the similar image search apparatus described in patent reference 3, it is difficult for the user to freely select image data to be registered as a search key, and accordingly, the search accuracy may be degraded.

The present invention has been made in consideration of the above situation, and has as its object to allow a user to easily and simply designate or input image data serving as a search key.

It is another object of the present invention to allow a user to easily designate or input image data serving as a search key even in a limited display region of document data.

Means for Solving the Problems

In order to achieve the above objects, according to an aspect of the present invention, there is provided a search apparatus for searching desired data from a plurality of stored data on the basis of a predetermined search key, comprising:

reading means to read a document image to obtain image data;

region extraction means to extract an image region in the image data;

display means to display information;

input means to input an instruction; and list display means to display, on the display means, a list of a plurality of images corresponding to the image regions extracted by the region extraction means, wherein when the input means selects at least one of the plurality of images displayed in the list, search is executed by using the selected image as a search key.

In order to achieve the above objects, according to another aspect of the present invention, there is provided a search method of searching desired data from a plurality of stored data on the basis of a predetermined search key, comprising steps of:

reading a document image to obtain image data;

extracting an image region in the image data;

displaying, on display means for displaying information, a list of images corresponding to the image regions extracted in the region extraction step, and executing search, when input means for inputting an instruction selects at least one of the images displayed in the list, by using the selected image as a search key.

That is, in the present invention, a search apparatus for searching data from stored data on the basis of a predetermined search key extracts an image region in image data obtained by reading a document image, displays, on display means for displaying information for a user, a list of images corresponding to the extracted image regions, and when the user selects at least one of the images displayed in the list by using input means for causing the user to input an instruction, executes the search by using the selected image as a search key.

This arrangement extracts an image in a document, displays a list of extracted images, and executes the search by using an image selected by the user as a search key.

Hence, the user can easily and simply designate or input an image serving as a search key, resulting in an increase in convenience for the user.

A computer program that causes a computer apparatus to execute the above search method and a storage medium that stores the computer program also achieve the above objects.

Effects of the Invention

According to the present invention, the search apparatus extracts images in a document as image data, displays a list of the image data, and executes search by using, as a search key, image data selected by the user from the image data displayed in the list.

Hence, the user can easily and simply designate or input image data serving as a search key, resulting in an increase in convenience for the user.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention and, together with the description, serve to explain the principles of the invention.

BEST MODE FOR CARRYING OUT THE INVENTION

Preferred embodiments of the present invention will now be described in detail in accordance with the accompanying drawings. Note that each element in the following embodiments is not intended to limit the scope of the invention, but is merely an example.

Figure 1:
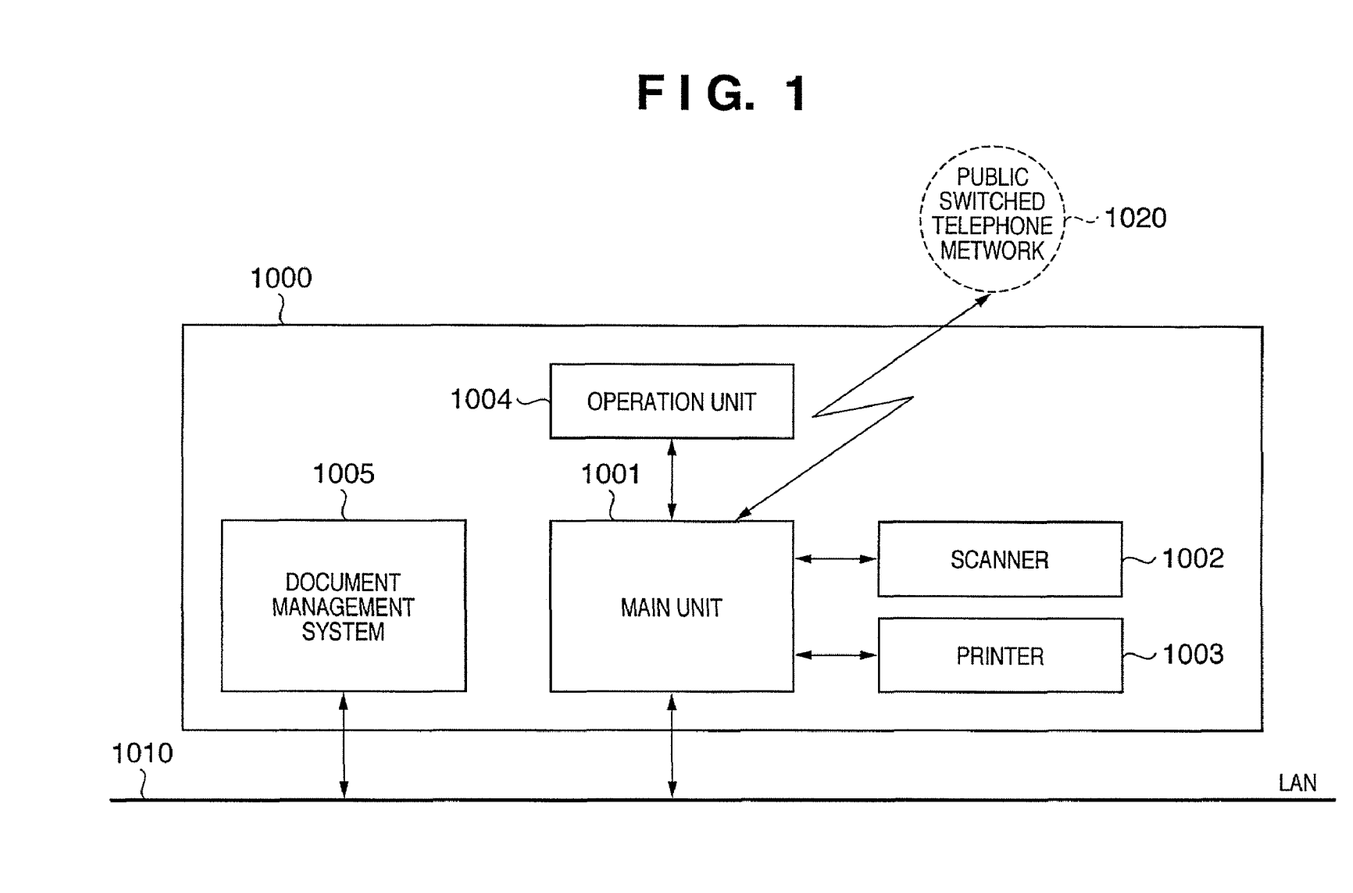
FIG. 1 is a block diagram for explaining the overall arrangement of a document search apparatus according to an embodiment of the present invention.

FIG. 1 is a block diagram for explaining the overall arrangement of a document search apparatus according to an embodiment of the present invention.

A document search apparatus 1000 of this embodiment comprises a scanner 1002 serving as an image input device, a printer 1003 serving as an image output device, and an operation unit 1004 serving as a user interface unit. The apparatus 1000 also includes a main unit 1001 to control them, and a document management system 1005 having functions for storing, managing, and searching document data. Each of the scanner 1002, printer 1003, and operation unit 1004 is connected to the main unit 1001 via an internal bus (not shown) through corresponding interfaces.

The main unit 1001 is connected to a network transmission means such as a LAN 1010 and a public switched telephone network 1020. The document management system 1005 is also connected to the LAN 1010 to communicate data and commands with the main unit 1001 via the LAN 1010. Instead of providing the document management system 1005 in the document search apparatus 1000, an external server having the same function as that of the document management system 1005 may be connected to the outside of the document search apparatus 1000 through the LAN 1010.

The document search apparatus 1000 of this embodiment is configured to be recognizable as one apparatus by a user. The document search apparatus 1000 is designed as a multi-functional peripheral (MFP) having not only the document search function but also a copy function, facsimile function, printer function, and document storing function.

Figure 2:
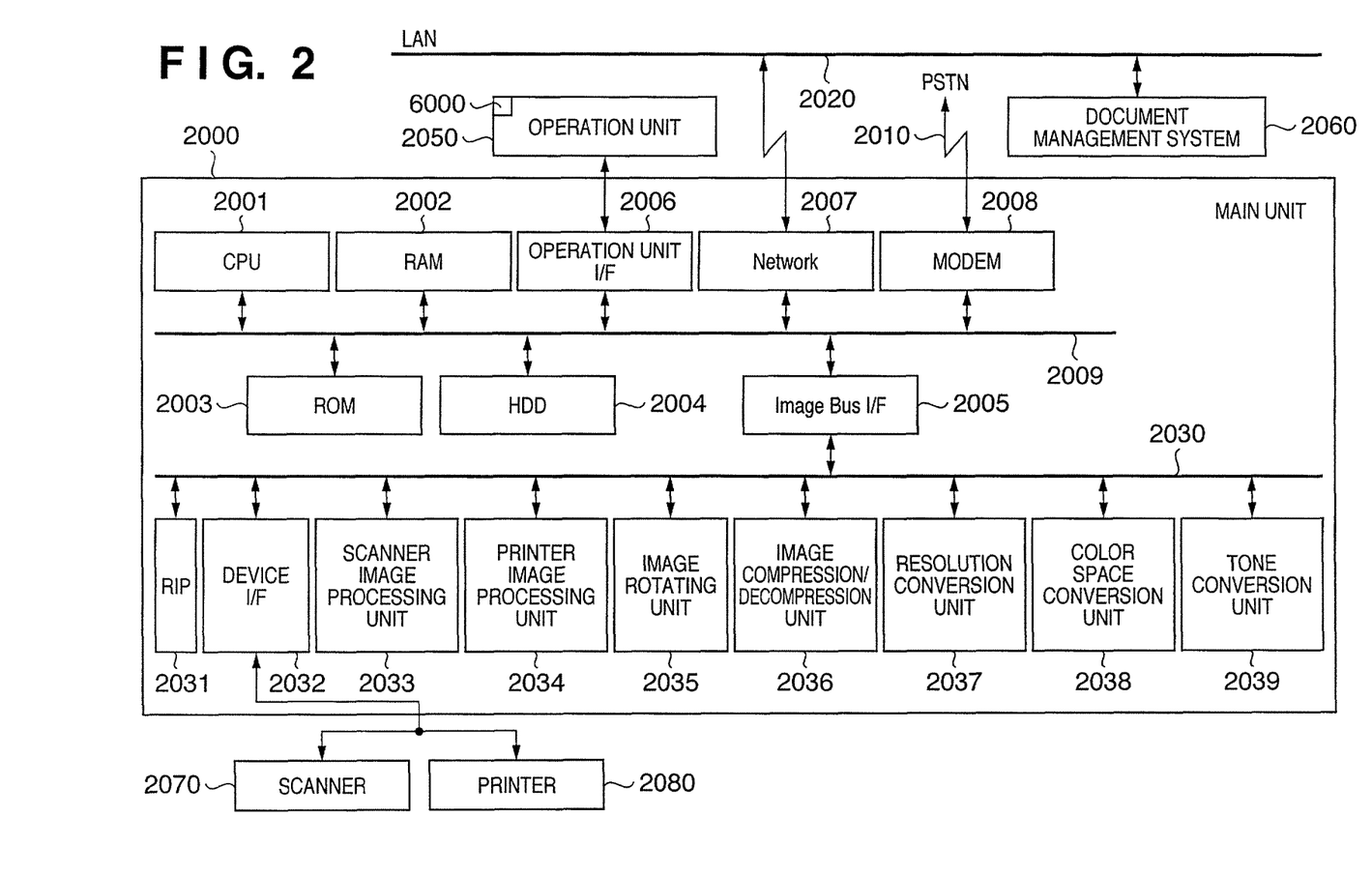
FIG. 2 is a block diagram for explaining the hardware configuration of the main unit of the document search apparatus shown in FIG. 1.

FIG. 2 is a block diagram for explaining the hardware configuration of the main unit 1001 of the document search apparatus shown in FIG. 1. Reference numeral 1001 in FIG. 1 corresponds to 2000 in FIG. 2, 1002 corresponds to 2070, 1003 corresponds to 2080, 1004 corresponds to 2050, 1005 corresponds to 2060, 1010 corresponds to 2020, and 1020 corresponds to 2010, respectively.

Referring to FIG. 2, the main unit 2000 is a controller for inputting and/or outputting document data, image information, and device information. The main unit 2000 implements scanner and printer functions through the scanner 2070 serving as an image input device and the printer 2080 serving as an image output device connected thereto. The main unit 2000 also implements functions of storing, reading, and searching documents by communicating with an external device such as the document management system 2060 or PC (not shown) through the LAN 2020. The main unit 2000 is also connected to the public switched telephone network (PSTN) 2010 to implement a facsimile function. The operation unit 2050 serving as a user interface (UI) to provide these functions to the user is connected to the main unit 2000.

A CPU 2001 is a controller to control the entire main unit 2000. A RAM 2002 is a system work memory to operate the CPU 2001. The RAM 2002 is also used as an image memory to temporarily store image data. A ROM 2003 is a boot ROM storing the boot program of the system. An HDD 2004 is a hard disk drive to store system software, image data, attribute data related to the image data, and other user data. An operation procedure for document search (to be described later) is implemented by, e.g., executing the system software stored in the HDD 2004.

An operation unit I/F 2006 serves as an interface unit to the operation unit 2050 and outputs, to the operation unit 2050, image data to be displayed on a display device 6000 of the operation unit 2050. The operation unit I/F 2006 also transmits, to the CPU 2001, information inputted by the user through the operation unit 2050.

A Network 2007 is connected to the LAN 2020 to input/output information from/to an external device such as the document management system 2060 or a PC connected to the LAN 2020. The document search apparatus 1000 supports TCP/IP as a network communication protocol. The document management system 2060 also communicates in accordance with the TCP/IP communication protocol.

A MODEM 2008 is connected to the public switched telephone network (PSTN) 2010 to communicate image data to a facsimile apparatus (not shown) arranged on the public switched telephone network 2010 by using the facsimile function. The above-described devices are connected to a system bus 2009.

An Image Bus I/F 2005 serves as a bus bridge which is connected to the system bus 2009 and an image bus 2030 for transferring image data at a high speed and converts a data structure. The image bus 2030 is configured with a PCI bus or IEEE1394 bus.

The following devices are arranged on the image bus 2030. A raster image processor (RIP) 2031 rasterizes a PDL code input from, e.g., the PC connected to the LAN 2020 to a bitmap image. A device I/F 2032 connects the scanner 2070 and printer 2080 serving as image input/output devices to the main unit controller 2000 and converts the synchronous/asynchronous system of image data.

A scanner image processing unit 2033 corrects, manipulates, and edits image data from the scanner 2070. The scanner image processing unit 2033 has a function of determining on the basis of color signal components of the image data whether the input image data is a color image or monochrome image and holding the determination result.

A printer image processing unit 2034 corrects, manipulates, and edits image data outputted from the printer 2080. An image rotating unit 2035 rotates image data read by the scanner 2070 simultaneously with the reading in cooperation with the scanner image processing unit 2033, and stores the image data in the RAM 2002. The image rotating unit 2035 also rotates image data in the RAM 2002. The image rotating unit 2035 also makes it possible to print the image data in the HDD 2004 or the RAM 2002 while rotating the image data in cooperation with the printer image processing unit 2034.

A resolution conversion unit 2037 converts the resolution of the image data in the RAM 2002 and stores the image data in the RAM 2002 again. A color space conversion unit 2038 converts, e.g., YUV image data in the RAM 2002 into Lab image data by a matrix operation and stores the image data in the RAM 2002 again. A tone conversion unit 2039 converts, e.g., 9-bit 256-tone image data in the RAM 2002 into 1-bit 2-tone image data by a technique such as error diffusion processing and stores the image data in the RAM 2002 again. An image compression/decompression unit 2036 compresses/decompresses multilevel image data in accordance with a format such as JPEG and binary image data in accordance with a format such as JBIG, MMR, MR, or MH.

The image rotating unit 2035, resolution conversion unit 2037, color space conversion unit 2038, tone conversion unit 2039, and image compression/decompression unit 2036 can be linked together. For example, the rotation processing and resolution conversion processing of the image data in the RAM 2002 can be done simultaneously without temporarily storing the data in the RAM 2002.

Figure 3:
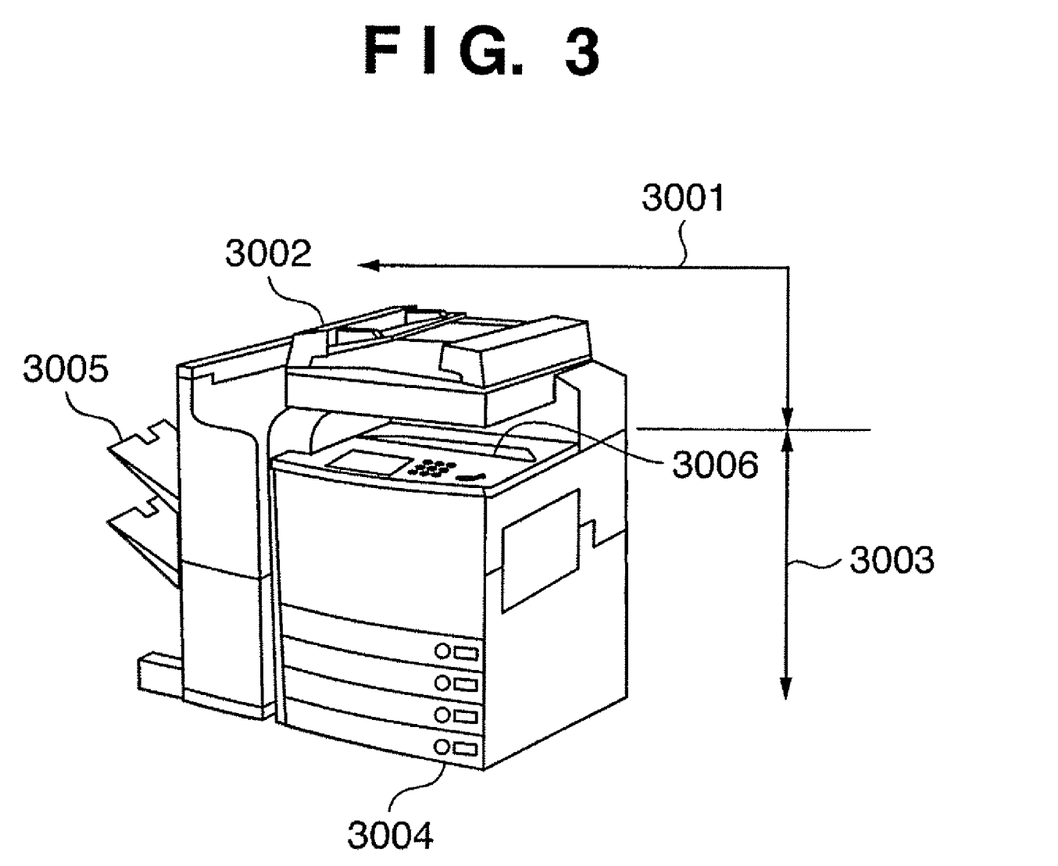
FIG. 3 is a view showing the outer appearance of the document search apparatus according to the present invention.

FIG. 3 is a perspective view showing the outer appearance of the document search apparatus 1000 according to this embodiment. As described with reference to FIG. 1, the document search apparatus 1000 of this embodiment is provided to the user as a multifunctional peripheral having a copy function, facsimile function, printer function, and document management function.

A scanner unit 3001 serving as an image input device irradiates a document on a printing medium such as a paper sheet and scans a CCD line sensor, thereby converting the document into raster image data, i.e., an electrical signal. Namely the user sets document sheets on the tray of a document feeder 3002 and instructs the start of reading via the operation unit 3006. Then, the main unit controller CPU 2001 shown in FIG. 2 gives the instruction to the scanner 2070. The document feeder 3002 conveys the document sheets one by one, and the document reading operation starts.

A printer unit 3003 serving as an image output device outputs raster image data as a printed image on a paper sheet, and any print system is available. For example, either electrophotography type using a photosensitive drum or photosensitive belt or an inkjet type that ejects ink from a small nozzle array and directly prints image data on a paper sheet can be used.

The print operation starts in response to an instruction from the CPU 2001 serving as a controller. The printer unit 3003 has a plurality of feed stages 3004 to select various paper sizes and orientations of paper. Corresponding paper cassettes are set in the feed stages 3004. Further, a discharge tray 3005 receives printed paper sheets. Post-processing such as sorting and stapling can also be done in accordance with an instruction from the CPU 2001 serving as a controller.

The main unit 1001 and the document management system 1005 shown in FIG. 1 are arranged in the document search apparatus 1000 and are therefore invisible from outside.

Figure 4:
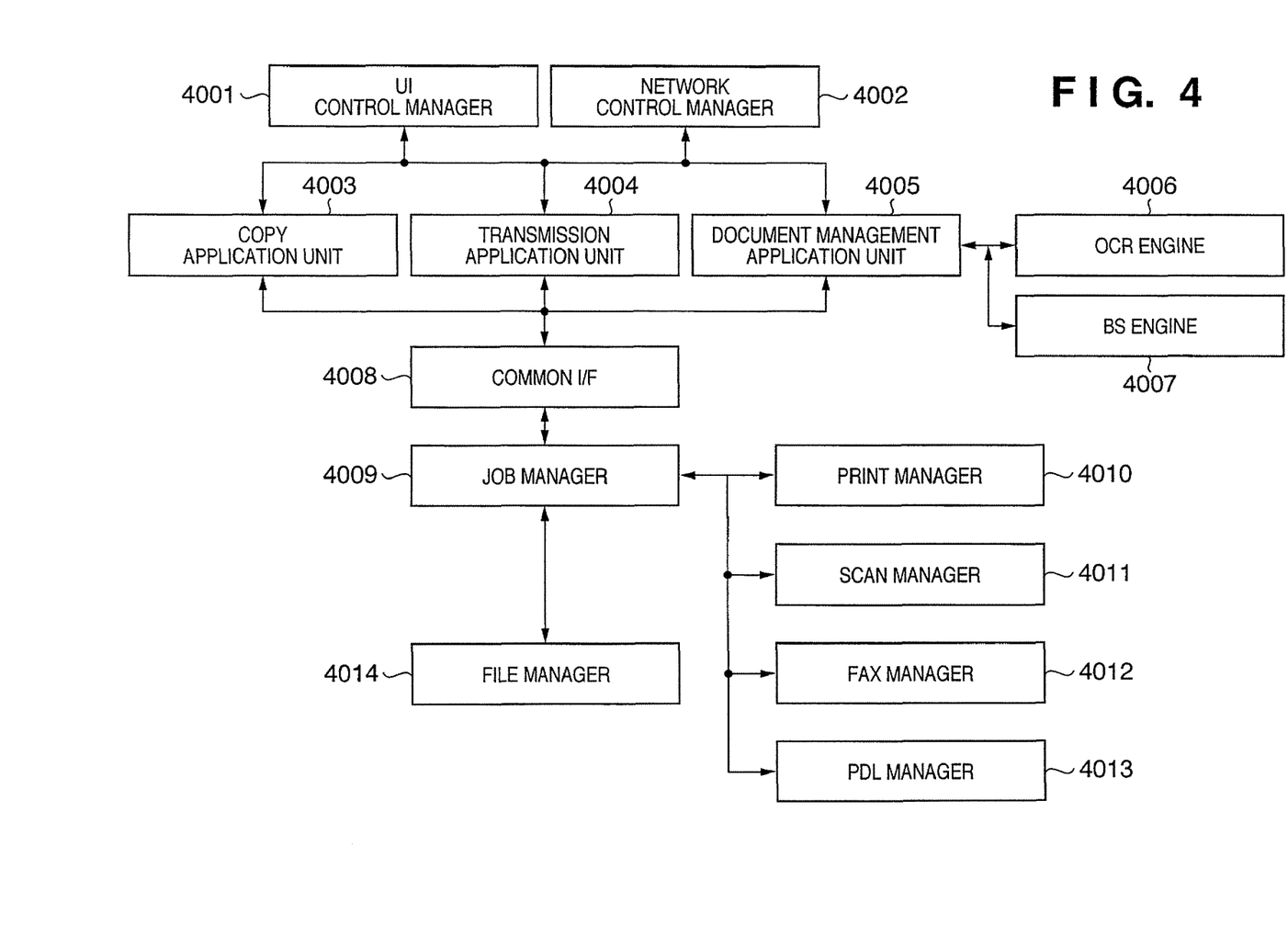
FIG. 4 is a block diagram showing the software configuration of the main unit of the document search apparatus according to the present invention.

FIG. 4 is a block diagram showing the software configuration of the main unit 1001 of the document search apparatus 1000 according to this embodiment. The software shown in FIG. 4 is stored in the HDD 2004 shown in FIG. 2.

An UI control manager 4001 for controlling the operation unit 2050 controls to transmit a user instruction to a lower layer module or display information from a lower layer on the display device 6000 of the operation unit 2050. A network control manager 4002 controls to receive an instruction or information through the network or transmit an instruction or information from the main unit 1001.

A copy application unit 4003 and a transmission application unit 4004 receive an instruction from the UI control manager 4001 and cause each of manager units (to be described later) to execute a copy job and a transmission job.

A document management application unit 4005 communicates with the document management system 1005, and provides a document management function. The document management application unit 4005 controls search processing (to be described later). The document management application unit 4005 is connected to an OCR engine 4006 that extracts text information from image data contained in the document data, and to a block selection (BS) engine 4007 that extracts image data in a desired region from image data contained in the document data.

The BS engine 4007 of this embodiment identifies image areas and text areas in the image data and generates information of type, position, and size of each area in the image data. The BS engine 4007 can also determine various attribute blocks (e.g., table block, line art block, background block, etc.) other than the image areas and the text areas, and extract blocks (area) of each attribute.

A common interface unit 4008 absorbs the device-dependent portion of each manager unit of the lower layer. A job manager 4009 arranges out pieces of job information received from the common interface unit 4008, and transmits them to a plurality of managers (4010 to 4014) closely related to devices of the lower layer. For example, if a received job indicates "local copy", the job manager 4009 controls the scan manager 4011 and the print manager 4010.

If the received job is a facsimile transmission job, the job manager 4009 controls the scan manager 4011, the file manager 4014 for document storing, and the facsimile manager 4012. If the received job is a PDL print job of LIPS or PostScript, the job manager 4009 controls the PDL manager 4013, the file manager 4014, and the print manager 4010. In this way, the job manager 4009 controls processing such as activation, synchronization, and termination of each manager in accordance with the received job.

Figure 5:
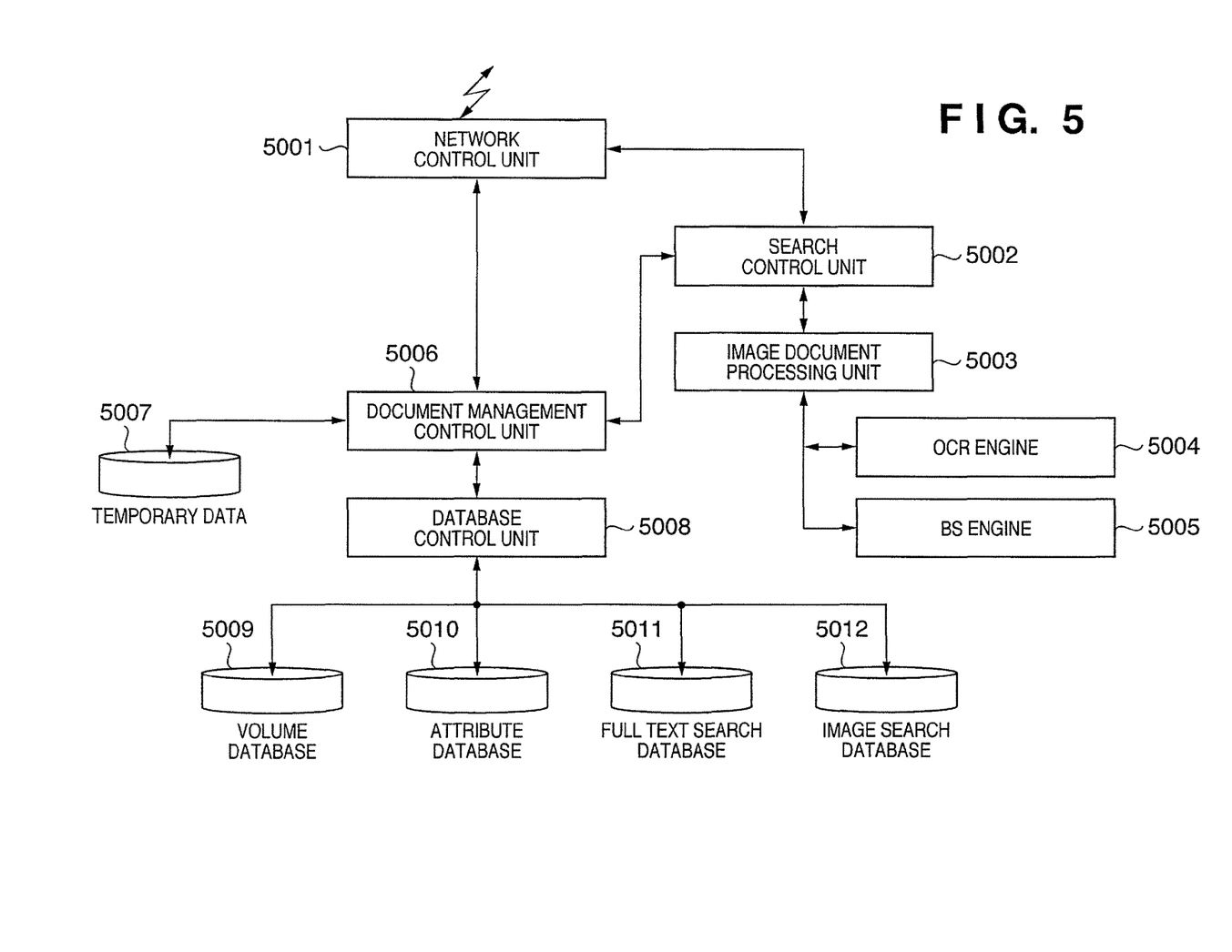
FIG. 5 is a block diagram showing the software configuration of a document management apparatus according to the present invention.

FIG. 5 is a block diagram showing the software configuration of the document management system 1005 arranged in the document search apparatus 1000 according to this embodiment shown in FIG. 1. The document management system 1005 provides functions of storing, acquiring, and searching of documents to the main unit 1001. Reference numerals 5004 and 5005 in FIG. 5 denote the same parts as 4006 and 4007 in FIG. 4.

A network control unit 5001 controls communication with the network control manager 4002 of the main unit 2000. A search control unit 5002 executes processing for the search requested from the main unit 2000 or processing of creating a search index of stored document data.

An image document processing unit 5003 performs creation ofe thumbnail image data or conversion of an image as needed. The image document processing unit 5003 also extracts a search index from registered document data in accordance with the registered document data. That is, the document data to be registered in the document management system 1005 is converted into a predetermined format by the image document processing unit 5003. For the image data, the block selection (BS) engine 5005 extracts an image area contained in the document data. For the text (character) data, the OCR engine 5004 extracts index data and fixed character information from the image data contained in the document data.

A document management control unit 5006 distributes all processes regarding document managements. Reference numeral 5007 denotes a storage location of temporary data used on the document management system side.

A database control unit 5008 performs creation of various kinds of data to be stored in the databases and storing the various kinds of data corresponding to a volume database 5009, attribute database 5010, full text search database 5011, and image search database 5012. The database control unit 5008 also reads out the data from each database and creates document data to be transferred to the main unit 1001 in accordance with a request from the main unit 1001.

The volume database 5009 stores the entities of the document data. The volume database 5009 is a conceptual unit, and its entity may be a file system on the OS of the document management system 1005. The attribute database 5010 stores information about attributes such as a name, date of creation, and comment of the document data. The full text search database 5011 registers index data and fixed character information extracted from the registered document data by the OCR engine 5004. When the main unit 1001 instructs a full text search, the full text search is performed to the full text database 5011. The image search database 5012 registers features of image areas extracted from the registered document data by the block selection (BS) engine 5005 in association with the document data. When the main unit 1001 instructs an image search, the image search is performed to the image search database 5012 to find out associated document data in accordance with the feature of searching target image data.

Figure 6:
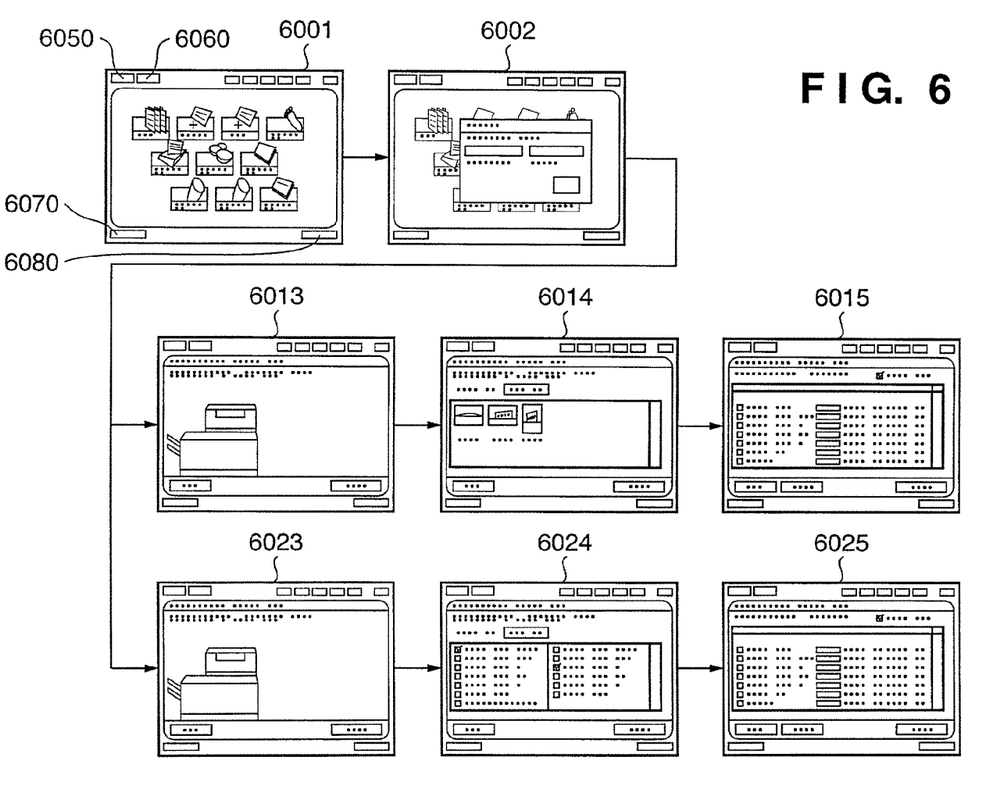
FIG. 6 is a view showing an example of transition of a window displayed on an operation unit in search processing of the document management apparatus according to the present invention.

FIG. 6 is a view showing an example of transition of a display window displayed on the display device 6000 provided in the operation unit 2050 in the search processing according to this embodiment. The procedure of the search processing according to this embodiment will be described with reference to FIG. 6.

A basic display window 6001 is displayed first. The operation unit 2050 of this embodiment uses a touch panel for the display device 6000. When the user presses a button displayed on the display window, a corresponding function is executed. In this example, a plurality of buttons corresponding to 10 functions including "copy", "transmit", and "search" are displayed. For search, buttons 6050 and 6060 corresponding to two functions, i.e., "Search with Criteria" and "Search for Original" are displayed in this example. "Search with Criteria" indicates searching for document data containing an image or keyword designated as a search key. On the other hand, "Search for Original" indicates searching for document data which entirely coincides with a read image of a document page (when a document having a plurality of pages is read, document data that coincides with the images of all document pages is searched for).

A display window 6002 is displayed after the "Search with Criteria" button 6050 is pressed on the basic display window 6001. In this display window, the user is able to select "Image Search" or "Keyword Search via OCR" by a button 6070 or 6080.

If the user selects "Image Search" in the display window 6002, a display window 6013 is displayed to set a document input waiting status to extract image data to be used as a search key.

When the display window 6013 is displayed, and the user sets a document and presses a "Scan Start" button, the document is read, and the BS engine extracts an image area from the read image data. The extracted image area is displayed on a display window 6014 as a thumbnail image. In this example, three thumbnail images are displayed. The user selects image data to be used as a search key on the display window 6014 and presses a "Search Start" button to execute the search. To select a thumbnail image, the user need only touch the area of the thumbnail image. A mark displayed in a check box provided on, e.g., upper left side of a thumbnail image indicates that the image is being selected. In this embodiment, the user is able to select a plurality of image data as search keys. In this case, the user is able to select whether to search by AND of the plurality of image data, or OR of the plurality of image data.

When the user presses the "eSearch Start" button, the main unit 1001 issues an instruction of "Image Search" to the document management system 1005. The document management system 1005 executes the search and returns the result to the main unit 1001. Upon receiving the search result, the main unit 1001 displays it on a display window 6015. The display window 6015 displays a list of information such as document names, coincidence rates (similarities), update dates, and storage locations. The user is able to select desired document data on the display window 6015 and execute an operation such as printing or transmission.

On the other hand, when the user selects "Keyword Search via OCR" on the display window 6002, a display window 6023 is displayed, and the system 1005 becomes a waiting status for inputting a document for extracting keywords.

When the display window 6013 is displayed, and the user sets a document and presses the "Scan Start" button, the document is read, and the OCR engine extracts keywords from the read image data. Thus extracted keywords are listed on a display window 6024. The user selects a keyword to be used as a search key on the display window 6024 and presses the "Search Start" button to execute the search. To select a keyword, the user need only to touch the area of the keyword. A mark displayed in a check box provided on, e.g., upper left side of the keyword indicates that the keyword is being selected. In this embodiment, the user is able to select a plurality of keywords as the search keys. In this case, the user is able to select whether to search by AND of the plurality of keywords, or OR of the plurality of keywords.

When the user presses the "Search Start" button, the main unit 1001 issues an instruction of "Keyword Search via OCR" to the document management system 1005. The document management system 1005 executes the search and returns the result to the main unit 1001. Upon receiving the search result, the main unit 1001 displays the search result on a display window 6025. The display window 6025 displays a list of information such as document names, coincidence rates (similarities), update dates, and storage locations. The user is able to select desired document data on the display window 6025 and execute an operation such as printing or transmission.

Figure 7:
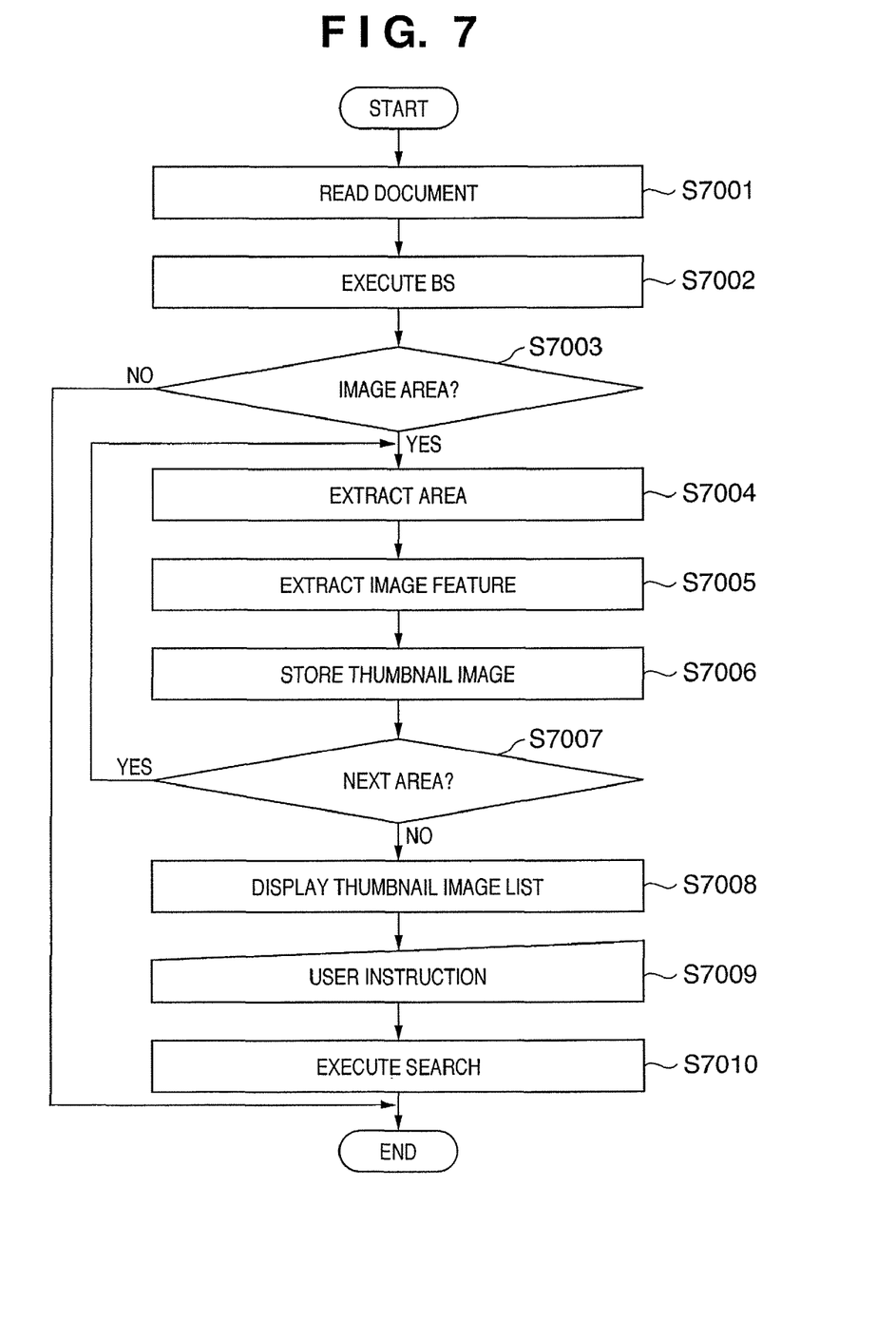
FIG. 7 is a flowchart showing processing executed by the main unit of the document management apparatus according to the present invention after selection of "Image Search" until execution of search.

FIG. 7 is a flowchart showing the processing executed by the main unit of the document search apparatus 1000 after selection of the "Image Search" until execution of the search according to this embodiment. This processing corresponds to the processing executed when the display windows 6013 and 6014 are displayed as depicted in FIG. 6.

When the user selects the "Image Search", sets a document to extract an image serving as a search key, and instructs the start of reading, the main unit 2000 activates the scanner 2070 to execute document reading processing (step S7001). The read image data is temporarily stored in the HDD 2004.

The main unit executes block selection (BS) for the stored image data (step S7002). The BS engine 4007 executes this processing in accordance with an instruction from the document management application 4005. As a result of the block selection, it is determined whether an image area is present (step S7003). If no image area is present, the processing is finished. However, if an image area is present, a corresponding image area is extracted from the stored image data, and stored in the RAM 2002 (step S7004).

Next, image features are extracted from the extracted image area (step S7005). This processing extracts, edge information, color information, and layout pattern of the image as the image features, and stores them in the HDD 2004 as a file. In this embodiment, the name of the file stored in the HDD 2004 includes a predetermined name and a serial number following it, like AREA01.xml and AREA02.xml. The main unit 2000 issues, to the document management system 2060, the "Image Search" instruction containing the information of the image features as a search key. Thereby, the amount of transferred data can be reduced as compared to a case wherein image data itself is transferred as a search key. The document management application unit 4005 executes the image feature extraction processing.

A reduced (thumbnail) image of the extracted image data is created, and stored in the HDD 2004 (step S7006). Even in this case, the name of the stored image includes a predetermined name and a serial number following it, like AREA01.jpg and AREA02.jpg. Since the processing is executed for each image area in this embodiment, the image feature information created in step S7005 is able to be associate with the thumbnail image.

It is determined whether the next image area is present (step S7007). If the next image area is present, the process returns to step S7004 to repeat the processing. If the next image area is not present, it is determined whether the processing of all image areas is finished. The list of the thumbnail images stored in step S7006 is displayed on the display window 6014 (step S7008).

When the user selects the image data to be used as a search key, and instructs the start of the search (step S7009), the main unit 2000 issues, to the document management system 2060, the "Image Search" instruction containing the image feature information corresponding to the selected image data as a search key (step S7010). Then the processing is finished.

Figure 8:
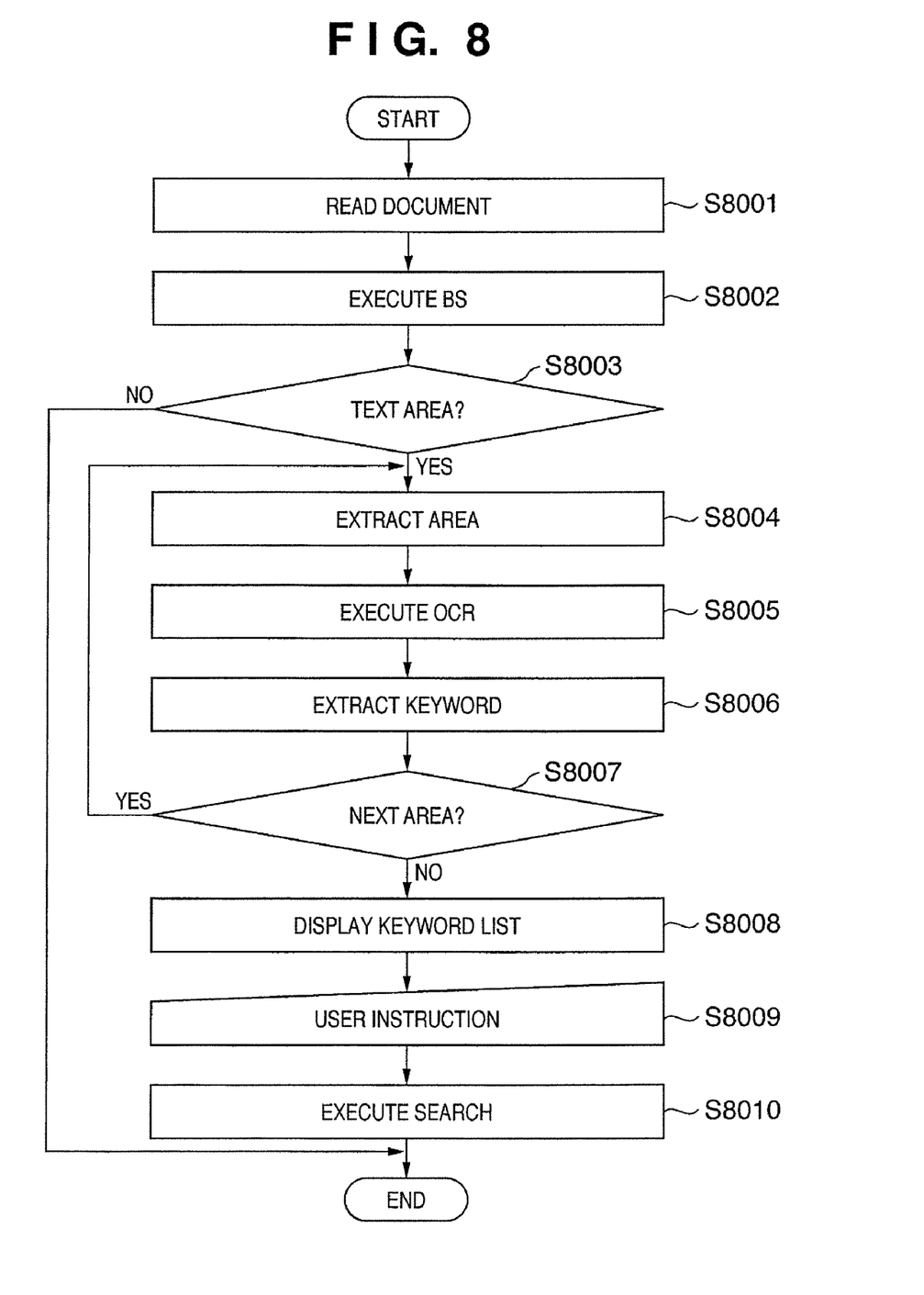
FIG. 8 is a flowchart showing processing executed by the main unit of the document management apparatus according to the present invention after selection of "Keyword Search via OCR" until execution of search.

FIG. 8 is a flowchart showing the processing executed by the main unit of the document search apparatus 1000 after selection of "Keyword Search via OCR" until execution of search according to this embodiment. This processing corresponds to the processing executed when the display windows 6023 and 6024 are displayed as depicted in FIG. 6.

When the user selects the "Keyword Search via OCR", sets a document to extract a keyword, and instructs the start of reading, the main unit 2000 activates the scanner 2070 to execute document reading processing (step S8001). The read image data is temporarily stored in the HDD 2004.

The block selection (BS) is executed for the stored image data (step S8002). The BS engine 4007 executes this processing in accordance with the instruction from the document management application 4005. As a result of the block selection, it is determined whether a text area is present (step S8003). If no text area is present, the processing is finished. If a text area is present, corresponding text area is extracted from the stored image data and stored in the RAM 2002 (step S8004).

The main unit extracts a character string from the extracted text area by OCR (step S8005). The OCR engine 4006 executes this processing. The extracted character string undergoes morpheme analysis processing to extract nouns. The extracted nouns are arranged in accordance with the priority order based on the frequency or position of appearance, and stored in the HDD 2004 as a keyword list. If already stored keyword list exists, the nouns are added thereto, and stored (step S8006). The document management application unit 4005 executes the above-mentioned keyword extraction processing.

Then, it is determined whether the next text area is present (step S8007). If the next text area is present, the process returns to step S8004 to repeat the processing. If the next text area is not present, it is determined that the processing of all areas is finished. The keyword list stored in step S8006 is displayed on the display window 6024 (step S8008).

When the user selects a keyword to be used as a search key, and instructs the start of search (step S8009), the main unit 2000 issues, to the document management system 2060, a full text search instruction containing the selected keyword as a search key (step S8010). Then the processing is finished.

As described above, according to this embodiment, the list of the thumbnail images corresponding to the image data in the read document is displayed so that the user is able to easily select the image data from the list to be used as a search key.

Hence, the user is able to easily and simply designate or input the image data serving as a search key, resulting in an increase in convenience for the user.

OTHER EMBODIMENT

The arrangements, the processing procedures, and the operation display windows described in the above embodiment are merely examples. The arrangements or the processing procedures may be changed or modified as long as the objects of the present invention can be achieved.

For example, in the above embodiment, the thumbnail images corresponding to the image areas of the read document are displayed. It is, however, possible to display the images in actual size if the list thereof can be displayed on the basis of the relationship between the display region size and the number and sizes of the image areas. In this case, it is determined whether a list type display is possible. If the list type display is impossible, each image may be reduced to a size to allow such list type display, or the reduction ratio for the image may be changed in accordance with the number of images to be displayed in the list form.

In the above embodiment, the display device provided in the operation unit has a touch panel provided on the display screen. However, any other operation means (e.g., keys and buttons) other than the touch panel may be used to select an image to be used for search from the listed images.

The format of image data is not limited to that described in the above embodiment, and an appropriate format can be used as needed.

The above-described embodiment distinguishes between the processing using image data as a search key and the processing using text data as a search key. However, the present invention is not limited to this. The search based on an OR or AND of the image data and the character string is also possible.

Precise search may be done by adding another search condition (e.g., a document creation date/time, update date/time, storage location, document name, file type, and character string) from the operation to the search keys of the image and the text data.

Another attribute (table, line art, or background) obtained by the block selection may also be used as a search key in addition to the search keys of the image and text data in the document.

The embodiment of the present invention has been described above in detail. The present invention is applicable to a document search system including a plurality of devices, or a document search apparatus including a single device.

For example, in the above-described embodiment, the present invention is applied to a multifunctional peripheral with a scanner function, copy function, printer function, and facsimile function. Of these functions, the copy function, facsimile function, and printer function are not essential. Hence, a system including a scanner (reading apparatus) and an information processing apparatus such as a computer corresponding to the main unit and operation unit can also applicable to the present invention. In this case, the document management system of the above embodiment can be either provided in the computer apparatus, or connected through a network as an external device.

When the document management system is an external device, a plurality of external devices may be prepared so that the user can designate an external device to be used for the search. Alternatively, all searchable external devices may execute the search.

A search key is extracted from the image data of the image obtained by reading the document by the scanner function. However, any other image data may be used. For example, a search key may be extracted from the image data received by facsimile, the image data received by an e-mail function or FTP function through a network such as the LAN 2020, or the image data contained in data received from a Web server. Print data received from another print client may also be used.

The user can select, through the operation unit 2050, one of the image data stored in the HDD 2004 and extract a search key.

The present invention is also achieved even by supplying a software program which implements the functions of the above-described embodiment to the system or apparatus directly or from a remote site and causing the computer of the system or apparatus to read out and execute the supplied program. In the above-described embodiment, the program corresponds to the flowcharts in FIGS. 7 and 8. The form need not always be a program if the functions of the program can be obtained.

Hence, the program code itself, which is installed in a computer to implement the functional processing of the present invention by the computer, also implements the present invention. That is, the claim of the present invention also incorporates the computer program itself to implement the functional processing of the present invention.

In this case, the program can take any form such as an object code, a program to be executed by an interpreter, or script data to be supplied to the OS as long as the functions of the program can be obtained.

Various recording mediums are available to supply the program. Examples are a Floppy® disk, hard disk, optical disk, magnetooptical disk, MO, CD-ROM, CD-R, CD-RW, magnetic tape, nonvolatile memory card, ROM, and DVD (DVD-ROM or DVD-R).

To supply the program, a client computer may be connected to a homepage on the Internet by using a browser in the computer to download the program from the homepage to a recording medium such as a hard disk. The user can download either the computer program itself of the present invention or a compressed file containing an automatic install function.

The program code contained in the program of the present invention may be divided into a plurality of files so that the user can download the files from different homepages. That is, a WWW server which causes a plurality of users to download a program file that causes a computer to implement the functional processing of the present invention is also incorporated in the claim of the present invention.

The program of the present invention may be encrypted, stored in a storage medium such as a CD-ROM, and distributed to users. Any user who satisfies predetermined conditions can download key information for decryption from a homepage through the Internet, execute the encrypted program by using the key information, and install the program in the computer.

The functions of the above-described embodiment are implemented not only when the readout program is executed by the computer. For example, when, e.g., the OS running on the computer performs part or all of actual processing on the basis of the instructions of the program, the functions of the above-described embodiment can be implemented.

The program read out from the recording medium may be written in the memory of a function expansion board inserted into the computer or a function expansion unit connected to the computer. In this case, the CPU of the function expansion board or function expansion unit performs part or all of actual processing on the basis of the instructions of the program, thereby implementing the functions of the above-described embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2005-219441 filed Jul. 28, 2005, which is hereby incorporated by reference herein in its entirety.

The invention claimed is:

1. A search apparatus for executing a search of data corresponding to a search key, comprising:
    a reading unit configured to read a document on a sheet to obtain image data of the document;
    a mode selection unit configured to receive, from a user, an instruction for selecting one of an image search mode to execute a search using an image as the search key and a keyword search mode to execute a search using a keyword as the search key;
    an image extraction unit configured to extract images from the image data if the image search mode has been selected by the user;
    a keyword extraction unit configured to extract keywords from the image data if the keyword search mode has been selected by the user;
    a list display unit configured
        to display a list of the images which are on the sheet and extracted by said image extraction unit to enable the user to select an image as the search key from the list if the image search mode has been selected by the user, and
        to display a list of the keywords which are on the sheet and extracted by said keyword extraction unit to enable the user to select a keyword as the search key from the list if the keyword search mode has been selected by the user; and
    an input unit configured
        to input an instruction, from the user, for selecting an image as the search key from the list of the extracted images if the image search mode has been selected by the user, and
        to input an instruction, from the user, for selecting a keyword as the search key from the list of the extracted keywords if the keyword search mode has been selected by the user.

2. The search apparatus according to claim 1, wherein said input unit inputs another instruction, from the user, for selecting whether to use an AND or an OR of the selected keywords as the search key.

3. The search apparatus according to claim 1, wherein said keyword extraction unit divides the image data into a plurality of regions, identifies one or more text regions from the plurality of regions, and performs the OCR on the one or more text regions.

4. The search apparatus according to claim 1, further comprising:
    a sending unit configured to send a search instruction containing the keyword or the image selected as the search key to a document management system.

5. The search apparatus according to claim 1, wherein said keyword extraction unit arranges the keywords in accordance with the priority order based on the appearance frequency and an appearance position of each keyword.

6. The search apparatus according to claim 1, further comprising:
    a print unit configured to print document data which is found by the search based on the keyword or the image selected as the search key.

7. The search apparatus according to claim 1, wherein the search apparatus is a multifunctional peripheral having at least a reading function and a print function.

8. A search method of searching document data corresponding to a search key, comprising:
    reading a document on a sheet to obtain image data of the document;
    receiving, from a user, an instruction for selecting one of an image search mode to execute a search using an image as the search key and a keyword search mode to execute a search using a keyword as the search key;
    extracting images from the image data if the image search mode has been selected by the user;
    extracting keywords from the image data if the keyword search mode has been selected by the user;
    displaying
        a list of the images which are on the sheet and extracted from the image data to enable the user to select an image as the search key from the list if the image search mode has been selected by the user, and
        a list of the keywords which are on the sheet and extracted from the image data to enable the user to select a keyword as the search key from the list if the keyword search mode has been selected by the user; and
    inputting
        an instruction, from the user, for selecting an image as the search key from the list of the extracted images if the image search mode has been selected by the user, and
        an instruction, from the user, for selecting a keyword as the search key from the list of the extracted keywords if the keyword search mode has been selected by the user.

9. A non-transitory computer-readable storage medium storing a computer program for causing a computer to implement a method, said method comprising the steps of:
    receiving, from a user, an instruction for selecting one of an image search mode to execute a search using an image as a search key and a keyword search mode to execute a search using a keyword as the search key;
    controlling a reading unit to read a document on a sheet to obtain image data of the document;
    extracting images from the image data if the image search mode has been selected by the user;
    extracting keywords from the image data if the keyword search mode has been selected by the user;
    displaying
        a list of the images which are on the sheet and extracted from the image data to enable the user to select an image as the search key from the list if the image search mode has been selected by the user, and
        a list of the keywords which are on the sheet and extracted from the image data to enable the user to select a keyword as the search key from the list if the keyword search mode has been selected by the user; and
    inputting
        an instruction, from the user, for selecting an image as the search key from the list of the extracted images if the image search mode has been selected by the user, and
        an instruction, from the user, for selecting a keyword as the search key from the list of the extracted keywords if the keyword search mode has been selected by the user.

* * * * *